US012665683B2

(12) United States Patent
Adler et al.

(10) Patent No.: US 12,665,683 B2
(45) Date of Patent: Jun. 23, 2026

(54) METHOD OF CHANNEL SOUNDING ANTENNA CALIBRATION

(71) Applicant: GM Global Technology Operations LLC, Detroit, MI (US)

(72) Inventors: Aaron Adler, Rochester Hills, MI (US); Leo Lanctot, South Lyon, MI (US); Yohay Buchbut, Pardes Hanna (IL); John Sergakis, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 18/581,443

(22) Filed: Feb. 20, 2024

(65) Prior Publication Data

US 2025/0266910 A1 Aug. 21, 2025

(51) Int. Cl.
*H04B 17/11* (2015.01)
*H04B 7/04* (2017.01)
(Continued)

(52) U.S. Cl.
CPC ........... *H04B 17/11* (2015.01); *H04B 17/221* (2023.05)

(58) Field of Classification Search
None
See application file for complete search history.

(56) References Cited

U.S. PATENT DOCUMENTS

| | | | |
|---|---|---|---|
| 7,729,439 B2 * | 6/2010 | Zhang | H04B 7/0413 455/24 |
| 10,547,358 B2 * | 1/2020 | Forenza | H04B 7/0456 |

(Continued)

FOREIGN PATENT DOCUMENTS

| | | | |
|---|---|---|---|
| CN | 117529671 A | 2/2024 | |
| EP | 1062746 B1 * | 3/2004 | H04B 7/0897 |

OTHER PUBLICATIONS

Jason Hillyard et al., "Bluetooth Channel Sounding—A Step Towards 10-cm Ranging Accuracy for Secure Access, Digital Key, and Proximity Services." Bluetooth Blog, Nov. 30, 2023.

(Continued)

*Primary Examiner* — Pablo N Tran
(74) *Attorney, Agent, or Firm* — Honigman LLP; Matthew H. Szalach; Jonathan P. O'Brien

(57) ABSTRACT

A computer-implemented method that, when executed by data processing hardware, causes the data processing hardware to perform operations comprising detecting channel sounding between a first low energy communication device and a second low energy communication device, determining a number of antenna paths between two or more antennas coupled to each of the first low energy communication device and the second low energy communication device, configuring a link layer configuration and an interface protocol of the first low energy communication device and the second low energy communication device such that at least one mode-0 step is assigned to each antenna path if the number of antenna paths is greater than three, and executing antenna calibration for a channel sounding procedure at the first low energy communication device and second low energy communication device according to the link layer configuration and the interface protocol.

20 Claims, 3 Drawing Sheets

(51) Int. Cl.

| | |
|---|---|
| *H04B 7/06* | (2006.01) |
| *H04B 7/10* | (2017.01) |
| *H04B 17/12* | (2015.01) |
| *H04B 17/21* | (2015.01) |

(56) References Cited

U.S. PATENT DOCUMENTS

| | | | |
|---|---|---|---|
| 11,296,764 B2 * | 4/2022 | Hormis | H04B 7/15528 |
| 11,374,634 B2 * | 6/2022 | Miao | H04B 7/086 |
| 11,664,878 B1 * | 5/2023 | Bruzzone | H04B 7/0865 |
| | | | 375/349 |
| 12,289,148 B2 * | 4/2025 | Rakib | H04L 25/0224 |
| 2023/0327783 A1 * | 10/2023 | Li | H04B 7/02 |
| | | | 455/67.11 |

OTHER PUBLICATIONS

Bhargavi Nisarga, "High Accuracy, Low Cost Secure Ranging with Bluetooth Channel Sounding." Application note, Texas Instruments, Feb. 2024.

* cited by examiner

METHOD OF CHANNEL SOUNDING ANTENNA CALIBRATION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a method of channel sounding antenna calibration.

In general, channel sounding is a feature of low energy communication devices (e.g., Bluetooth® Low Energy (BLE) devices) for measuring and distributing information that can be used to approximate distances between two or more devices. Additionally, channel sounding can provide localization and/or positioning with three or more distance measurements (i.e., four or more devices ranging session). Thus, channel sounding may be desirable for characterizing a propagation path between the two or more devices. Current channel sounding protocol does not allow for more than three antenna paths to be properly calibrated, which can result in unreliable and inaccurate communication between devices. Shortcomings of the existing calibration protocol will be addressed by one or more aspects of the present disclosure.

SUMMARY

In one configuration, a computer-implemented method that, when executed by data processing hardware, causes the data processing hardware to perform operations is provided. The operations include detecting channel sounding between a first low energy communication device and a second low energy communication device, determining a number of antenna paths between two or more antennas coupled to each of the first low energy communication device and the second low energy communication device, configuring a link layer configuration and an interface protocol of the first low energy communication device and the second low energy communication device such that at least one mode-0 step is assigned to each antenna path if the number of antenna paths is greater than three, and executing antenna calibration for a channel sounding procedure at the first low energy communication device and second low energy communication device according to the link layer configuration and the interface protocol.

The method may include one or more of the following optional features. For example, the at least one mode-0) step may further include adjusting frequency and timing of each of the antenna paths to improve reliability and accuracy of communication between the first and second low energy communication devices.

According to at least one aspect, executing antenna calibration can further include calibrating transmit and receive chains of the first low energy communication device and the second low energy communication device. Executing antenna calibration for the channel sounding procedure can further include calibrating frequency of each antenna path. Executing antenna calibration for the channel sounding procedure can further include calibrating a first amplifier of the first low energy communication device and a second amplifier of the second low energy communication device automatically. Calibrating the first and second amplifiers of the first and second low energy communication devices can further include adjusting an automatic gain control of the first and second amplifiers. Executing antenna calibration for the channel sounding procedure can further include calibrating round trip timing for each antenna path.

In one configuration, a system is provide and includes a vehicle including a first low energy communication device including data processing hardware and memory hardware in communication with a transceiver coupled to two or more antennas, a mobile device including a second low energy communication device including data processing hardware and memory hardware in communication with a transceiver coupled to two or more antennas, the memory hardware of the first and second low energy communication devices storing instructions that, when executed on the data processing hardware, cause the data processing hardware to perform operations is provided. The operations include detecting channel sounding between the first low energy communication device and the second low energy communication device, determining a number of antenna paths between two or more antennas coupled to each of the first low energy communication device and the second low energy communication device, configuring a link layer configuration and an interface protocol of the first low energy communication device and the second low energy communication device such that at least one mode-0 step is assigned to each antenna path if the number of antenna paths is greater than three, and executing antenna calibration for a channel sounding procedure at the first low energy communication device and second low energy communication device according to the link layer configuration and the interface protocol.

The system may include one or more of the following optional features. For example, the at least one mode-0 step may further include adjusting frequency and timing of each of the antenna paths to improve reliability and accuracy of communication between the first and second low energy communication devices.

According to at least one aspect, executing antenna calibration can further include calibrating transmit and receive chains of the first low energy communication device and the second low energy communication device. Executing antenna calibration for the channel sounding procedure can further include calibrating frequency of each antenna path. Executing antenna calibration for the channel sounding procedure can further include calibrating a first amplifier of the first low energy communication device and a second amplifier of the second low energy communication device. Calibrating the first and second amplifiers of the first and second low energy communication devices can further include adjusting an automatic gain control of the first and second amplifiers. Executing antenna calibration for the channel sounding procedure can further include calibrating round trip timing for each antenna path.

In another configuration, a communication system is provided and includes a first low energy communication device including a first amplifier, data processing hardware, and memory hardware in communication with a transceiver coupled to two or more antennas, a second low energy communication device including data processing hardware and memory hardware in communication with a transceiver coupled to two or more antennas. The memory hardware of the first and second low energy communication devices storing instructions that, when executed on the data processing hardware, cause the data processing hardware to perform operations including detecting channel sounding between the first low energy communication device and the second low energy communication device, determining a number of radio frequency antenna paths between two or more antennas coupled to each of the first low energy communication device and the second low energy communication device, configuring a link layer configuration and an interface protocol of the first low energy communication device and the second low energy communication device such that at least one mode-0 step is assigned to each antenna path if the number of antenna paths is greater than three, and executing radio frequency antenna calibration for a channel sounding procedure at the first low energy communication device and second low energy communication device according to the link layer configuration and the interface protocol.

The system may include one or more of the following optional features. For example, the at least one mode-0 step further includes adjusting frequency and timing of each of the antenna paths to improve reliability and accuracy of communication between the first and second low energy communication devices.

According to one aspect, executing radio frequency antenna calibration may further include calibrating transmit and receive chains of the first low energy communication device and the second low energy communication device. Executing radio frequency antenna calibration for the channel sounding procedure may further include calibrating frequency of each antenna path.

According to another aspect, executing radio frequency antenna calibration for the channel sounding procedure may further include calibrating the first amplifier and the second amplifier of the second low energy communication device. Calibrating the first and second amplifiers of the first and second low energy communication devices may further include adjusting an automatic gain control of the first and second amplifiers.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
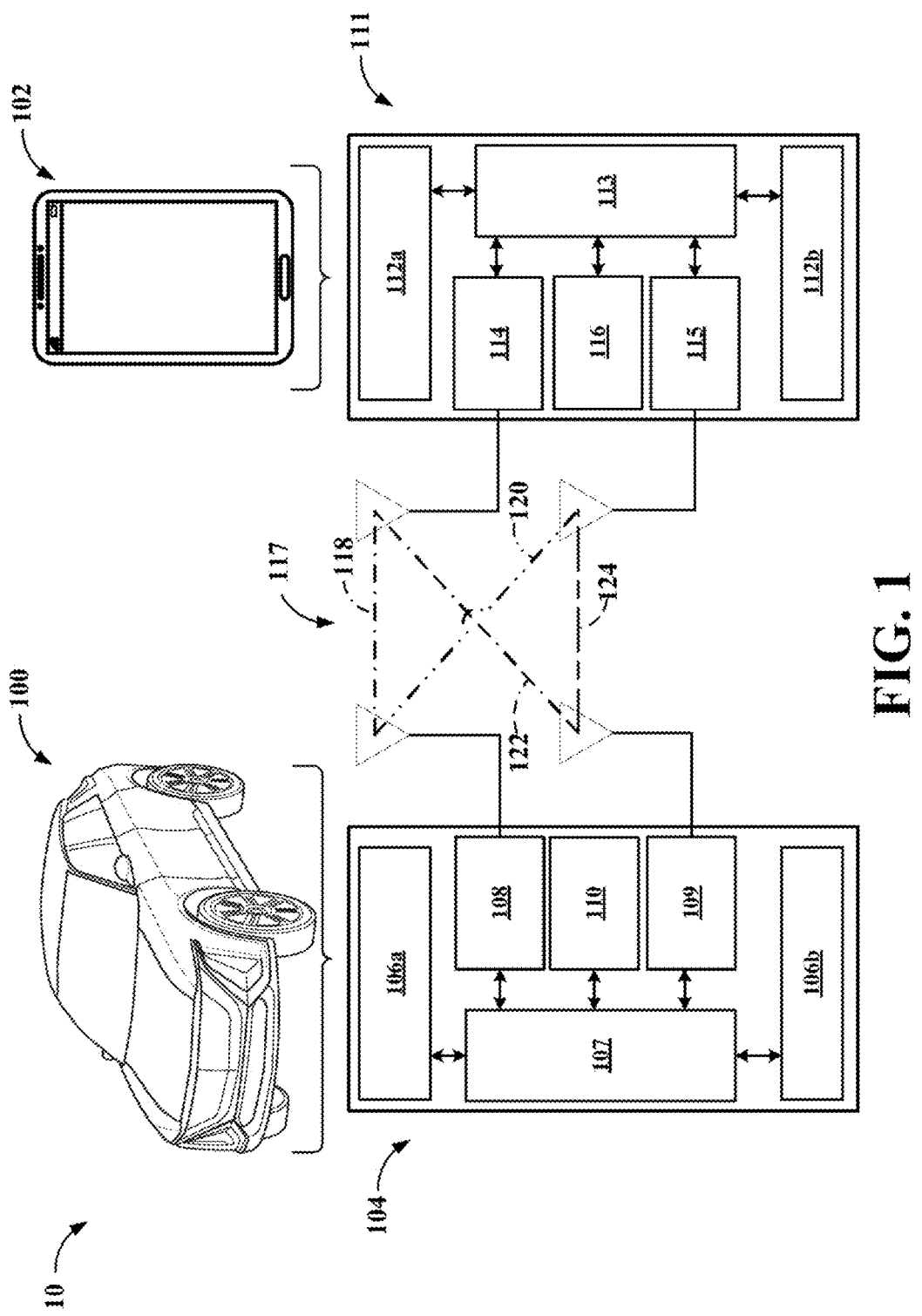
FIG. 1 is a schematic diagram of an operating environment including a vehicle, a mobile device, and a communication system.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise.

The terms "comprises," "comprising," "including." and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example operating environment 10 is provided for illustration of the principles of the present disclosure. The operating environment 10 includes a first device or vehicle 100 and a second or mobile device 102. The first and second devices 100, 102 may be any device that is equipped with or otherwise capable of low energy communication (e.g., Bluetooth® Low Energy (BLE)). Thus, in another example, the first device 100 can be a pair of wireless headphones and the second device 102 is the mobile device.

With continued reference to FIG. 1, the first device 100 includes a first or first low energy communication device (e.g., a vehicle Bluetooth® module) 104. The first low energy communication device 104 includes data processing hardware 106a and memory hardware 106b in communication with a transceiver 107 coupled to a first antenna 108 and a second antenna 109. A first amplifier 110 may also be coupled to or otherwise in communication with the transceiver 107. Likewise, the second device 102 includes a second or second low energy communication device (e.g., a device Bluetooth® module) 111. The second low energy communication device 111 includes data processing hardware 112a and memory hardware 112b in communication with a transceiver 113 coupled to a third antenna 114 and a fourth antenna 115. A second amplifier 116 may also be coupled to or otherwise in communication with the transceiver 113. One or more parameters of the first and second amplifiers 110, 116, such as automatic gain control (AGC), may be controlled to prevent saturation of a transmit and receive chain between the first and second low energy communication devices 104, 111. The network or communication between the low energy communication devices 104, 111 may be referred to as a 2×2 multiple input multiple output (MIMO) system or communication system 117. In other examples, the communication system 117 can include more or less antennas such that the communication is referred to as a 3×3 MIMO system, a 4×4 MIMO system, or a n×n MIMO system. In the present illustrative configuration, there are four (4) antenna paths (i.e., propagation paths, radio frequency paths, etc.) between the first and second devices 100, 102. With respect to the first antenna 108, a first antenna path 118 exists between the first antenna 108 and the third antenna 114 and a second antenna path 120 exists between the first antenna 108 and the fourth antenna 115. With respect to the second antenna 109, a third antenna path 122 exists between the second antenna 109 and the third antenna 114 and a fourth antenna path 124 exists between the second antenna 109 and the fourth antenna 115. Note, adding additional antennas to the first low energy communication device 104 and/or the second low energy communication device 111 can increase the number of antenna paths.

Figure 2:
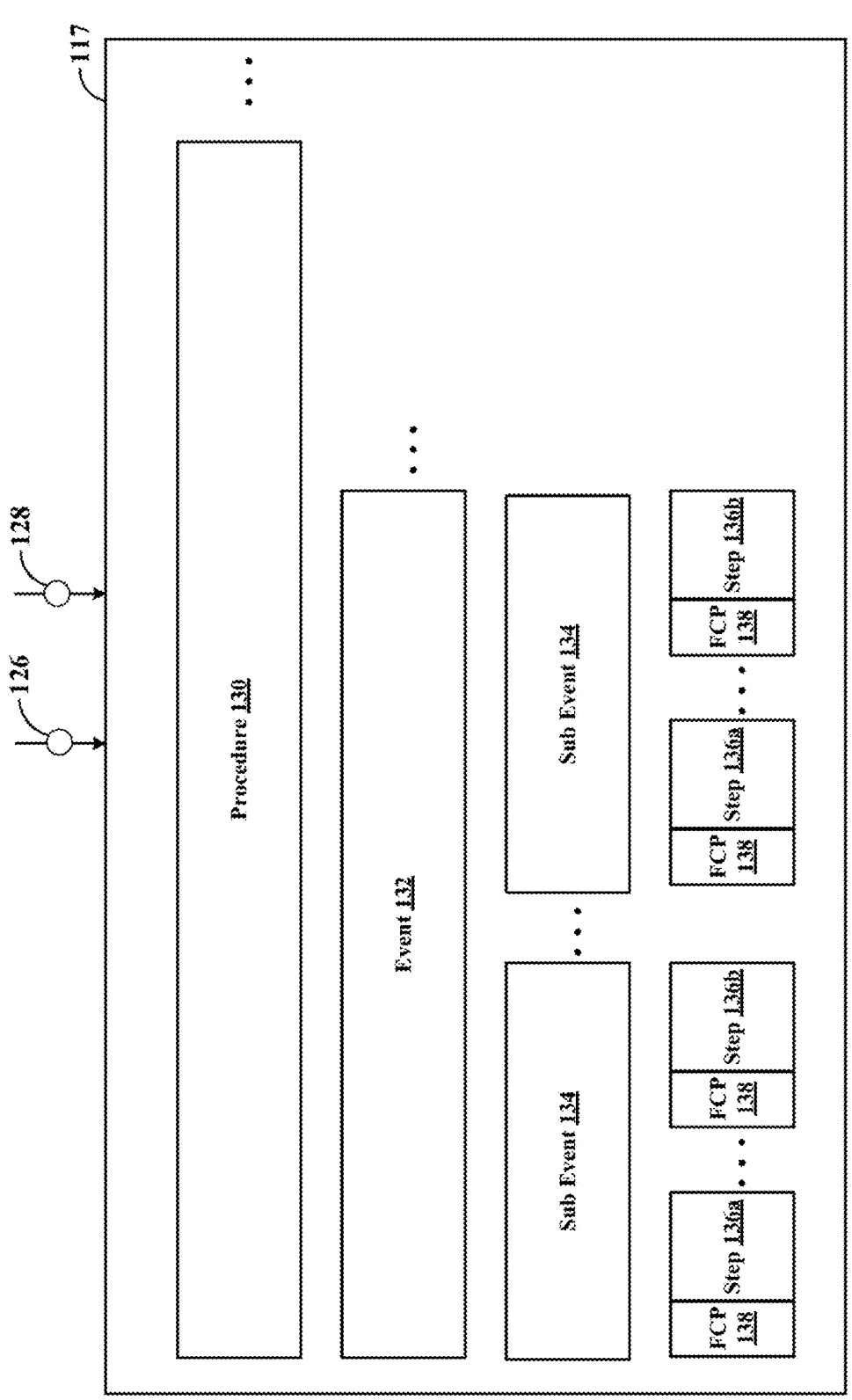
FIG. 2 is a schematic diagram showing a channel sounding procedure of the communication system of FIG. 1.

With reference to FIG. 2, the communication system 117 (i.e., the low energy communication devices 104, 111) may be configured with a link layer configuration 126 and an interface protocol 128. The link layer configuration 126 and the interface protocol 128 may further define a channel sounding procedure 130 so that the antenna paths 118, 120, 122, 124 between the low energy communication devices 104, 111 may be characterized. Data obtained from the channel sounding procedure 130 can enable one of the low energy communication devices 104, 111 to determine a distance to the other of the low energy communication devices 104, 111. Additional data may be gathered using the channel sounding procedure 130 concerning round-trip timing and phased-based ranging, for example. In general, channel sounding procedure 130 consists of events 132, sub events 134, and steps 136 which may be desirable for defining a set of time and frequency slots so that the low energy communication devices 104, 111 can communicate and exchange radio frequency (RF) signals with each other. More specifically, the channel sounding procedure 130 is divided into the events 132. The events 132 consist of one or more sub events 134. The sub events 134 consist of the steps 136 and, more particularly, two or more steps 136a, 136b that each start with a frequency change period (FCP) 138. Within the sub events 134, the first channel sounding steps 136a are used to provide calibration information for the remaining steps within that sub event 134.

There are four channel sounding step types including mode-0, mode-1, mode-2, and mode-3. In general, mode-0 can be used to calibrate the low energy communication devices 104, 111. More particularly, according to one aspect, mode-0 can be used to calibrate the antennas 108, 109, 114, 115 with respect to frequency and timing. Mode-1 can be used to exchange round trip timing (RTT) packet. Mode-2 can be used to exchange phase-based ranging (PBR) channel sounding tones to measure phase and amplitude of the communication channel. Mode-3 can be used to exchange both RTT and phase/amplitude measurements. Upon completion of the channel sounding procedure 130, the low energy communication devices 104, 111 retain data collected from each channel sounding step specific to a given communication channel. Mode-0 steps can reflect local frequency adjustments. Mode-1 and mode-3 steps can measure time of arrival and time of departure. Mode-2 and mode-3 steps can measure phase and magnitude information in the form of in-phase and quadrature-phase measurements.

Calibration of the antenna paths 118, 120, 122, 124 may be desirable to ensure that the channel sounding is reliable and accurate, but may be challenging with prior protocol. Prior protocol provides up to three mode-0 steps merely for interference retries rather than for calibrating each antenna path. In other words, prior protocol is configured for redundancy and not for calibration of additional antenna paths of the communication system 117. Thus, according to one aspect of the present disclosure, configuring the link layer configuration 126 so that there is at least one mode-0 step for each antenna path of the communication system 117 may be desirable to improve reliability and accuracy of the channel sounding procedure 130. More specifically, adding one or more additional mode-0 steps for each antenna path in excess of three paths may allow for proper frequency calibration, automatic gain control (AGC) calibration, and round trip timing calibration. Without proper calibration of the antennas, there is a possibility that upon completion of the channel sounding procedure 126 incorrect data can be provided for at least one of the four antennas. Improving accuracy may require less channel sounding measurements between the first and second devices and, thus, reduce latency and/or power consumption.

Figure 3:
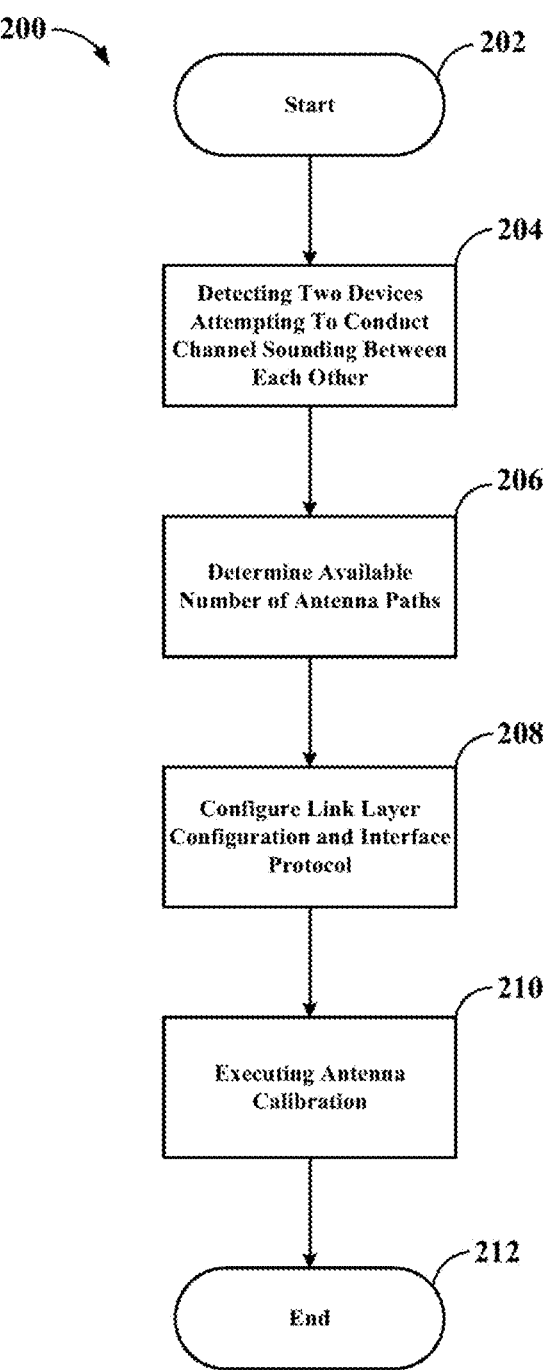
FIG. 3 is a flow diagram showing operations of the communication system of FIG. 1.

With reference to FIG. 3, a method 200 of channel sounding antenna calibration is provided. At 202, the method 200 is initiated. In practical terms, the method 200 is initiated any time the communication system 117 (i.e., the first and/or second low energy communication devices 104, 111) is using link layer configuration 126 and/or interface protocol 128.

At 204, the first and second devices 100, 102 may be configured to discover or otherwise detect when the other device (e.g., the first or second devices 100, 102) is attempting to conduct channel sounding. Thus, if, for example, the second low energy communication device 111 detects that the first low energy communication device 104 is attempting to conduct channel sounding with the second low energy communication device 111, then the method 200 may proceed to 206.

At 206, the first and second low energy communication devices 104, 111 can determine the number of antennas coupled to or otherwise in communication with the first and second low energy communication devices 104, 111. The number of antenna paths may be determined or otherwise calculated based on the number of antennas coupled to the first and second low energy communication devices 104, 111. As indicated above with respect to FIG. 1, the communication system 117 includes four antenna paths between the first low energy communication device 104 and the second low energy communication device 111.

At 208, the link layer configuration 126 and/or the interface protocol 128 of the first low energy communication device 104 and the second low energy communication device 111 are configured such that if the number of antenna paths is greater than three, then at least one mode-0 step is assigned to each of the antenna paths 118, 120, 122, 124.

According to at least one aspect of the present disclosure, the at least one mode-0 step may further include adjusting frequency and timing of each of the antenna paths 118, 120, 122, 124 to improve reliability and accuracy of communication between the antennas 108, 109, 114, 115. Additionally or alternatively, executing channel sounding antenna calibration can further comprise calibrating transmit/receive chains of the first low energy communication device 104 and the second low energy communication device 111. Executing channel sounding antenna calibration can include calibrating frequency, calibrating automatic gain control, and/or calibrating round trip timing for each of the antenna paths 118, 120, 122, 124. According to at least one aspect, executing antenna calibration for the channel sounding procedure can further include calibrating the first amplifier 110 of the first low energy communication device 104 and the second amplifier 116 of the second low energy communication device 111. Adjusting the AGC of the amplifiers 110, 116 may be desirable to improve performance of the transmit and receive chain (i.e., reduce its saturation) between the first low energy communication device 104 and the second low energy communication device 111.

The link layer configuration 126 and interface protocol 128 may be stored in the memory hardware 106*b* of the first and second low energy communication devices 104, 111 as instructions such that, when executed on the data processing hardware 106*a*, cause the data processing hardware 106*a* to perform operations according to the channel sounding procedure 130.

At 210, the radio frequency antenna paths 118, 120, 122, 124 of the antennas 108, 109, 114, 115 are calibrated according to the channel sounding procedure 130. In other words, at 210 antenna calibration for the channel sounding procedure 130 according to the link layer configuration 126 and the interface protocol 128 is executed at the first low energy communication device 104 and the second low energy communication device 111.

At 212, the method 200 ends.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:

detecting channel sounding between a first low energy communication device and a second low energy communication device;

determining a number of antenna paths between two or more antennas coupled to each of the first low energy communication device and the second low energy communication device;

configuring a link layer configuration and an interface protocol of the first low energy communication device and the second low energy communication device such that at least one mode-0 step is assigned to each antenna path if the number of antenna paths is greater than three; and executing antenna calibration for a channel sounding procedure at the first low energy communication device and second low energy communication device according to the link layer configuration and the interface protocol.

2. The method of claim 1, wherein the at least one mode-0 step further comprises adjusting frequency and timing of each of the antenna paths to improve reliability and accuracy of communication between the first and second low energy communication devices.

3. The method of claim 1, wherein executing antenna calibration further comprises calibrating transmit and receive chains of the first low energy communication device and the second low energy communication device.

4. The method of claim 3, wherein executing antenna calibration for the channel sounding procedure further comprises calibrating frequency of each antenna path.

5. The method of claim 3, wherein executing antenna calibration for the channel sounding procedure further comprises calibrating round trip timing for each antenna path.

6. The method of claim 3, wherein executing antenna calibration for the channel sounding procedure further comprises calibrating a first amplifier of the first low energy communication device and a second amplifier of the second low energy communication device automatically.

7. The method of claim 6, wherein calibrating the first and second amplifiers of the first and second low energy communication devices further comprises adjusting an automatic gain control of the first and second amplifiers.

8. A system, comprising:

a vehicle comprising a first low energy communication device comprising data processing hardware and memory hardware in communication with a transceiver coupled to two or more antennas;

a mobile device comprising a second low energy communication device comprising data processing hardware and memory hardware in communication with a transceiver coupled to two or more antennas;

the memory hardware of the first and second low energy communication devices storing instructions that, when executed on the data processing hardware, cause the data processing hardware to perform operations comprising:

detecting channel sounding between the first low energy communication device and the second low energy communication device;

determining a number of antenna paths between two or more antennas coupled to each of the first low energy communication device and the second low energy communication device;

configuring a link layer configuration and an interface protocol of the first low energy communication device and the second low energy communication device such that at least one mode-0 step is assigned to each antenna path if the number of antenna paths is greater than three; and executing antenna calibration for a channel sounding procedure at the first low energy communication device and second low energy communication device according to the link layer configuration and the interface protocol.

9. The system of claim 8, wherein the at least one mode-0 step further comprises adjusting frequency and timing of each of the antenna paths to improve reliability and accuracy of communication between the first and second low energy communication devices.

10. The system of claim 8, wherein executing antenna calibration further comprises calibrating transmit and receive chains of the first low energy communication device and the second low energy communication device.

11. The system of claim 10, wherein executing antenna calibration for the channel sounding procedure further comprises calibrating frequency of each antenna path.

12. The system of claim 10, wherein executing antenna calibration for the channel sounding procedure further comprises calibrating round trip timing for each antenna path.

13. The system of claim 10, wherein executing antenna calibration for the channel sounding procedure further comprises calibrating a first amplifier of the first low energy communication device and a second amplifier of the second low energy communication device.

14. The system of claim 13, wherein calibrating the first and second amplifiers of the first and second low energy communication devices further comprises adjusting an automatic gain control of the first and second amplifiers.

15. A communication system, comprising:
a first low energy communication device comprising a first amplifier, data processing hardware, and memory hardware in communication with a transceiver coupled to two or more antennas;
a second low energy communication device comprising data processing hardware and memory hardware in communication with a transceiver coupled to two or more antennas;
the memory hardware of the first and second low energy communication devices storing instructions that, when executed on the data processing hardware, cause the data processing hardware to perform operations comprising:
detecting channel sounding between the first low energy communication device and the second low energy communication device;

determining a number of radio frequency antenna paths between two or more antennas coupled to each of the first low energy communication device and the second low energy communication device;
configuring a link layer configuration and an interface protocol of the first low energy communication device and the second low energy communication device such that at least one mode-0 step is assigned to each antenna path if the number of antenna paths is greater than three; and
executing radio frequency antenna calibration for a channel sounding procedure at the first low energy communication device and second low energy communication device according to the link layer configuration and the interface protocol.

16. The system of claim 15, wherein the at least one mode-0 step further comprises adjusting frequency and timing of each of the antenna paths to improve reliability and accuracy of communication between the first and second low energy communication devices.

17. The system of claim 15, wherein executing radio frequency antenna calibration further comprises calibrating transmit and receive chains of the first low energy communication device and the second low energy communication device.

18. The system of claim 17, wherein executing radio frequency antenna calibration for the channel sounding procedure further comprises calibrating frequency of each antenna path.

19. The system of claim 15, wherein executing radio frequency antenna calibration for the channel sounding procedure further comprises calibrating the first amplifier and the second amplifier.

20. The system of claim 19, wherein calibrating the first and second amplifiers of the first and second low energy communication devices further comprises adjusting an automatic gain control of the first and second amplifiers.

* * * * *